United States Patent [19]

Tuss et al.

[11] Patent Number: 5,211,842
[45] Date of Patent: May 18, 1993

[54] THREE-PHASE WELL TEST APPARATUS USING PUMPED RECIRCULATION TO MAINTAIN HOMOGENOUS FLOW

[75] Inventors: Bernard M. Tuss, Houston; Robert A. Kendrick, Montgomery, both of Tex.

[73] Assignee: Conoco Inc., Ponca City, Okla.

[21] Appl. No.: 817,715

[22] Filed: Jan. 7, 1992

[51] Int. Cl.$^5$ .............................................. E21B 49/08
[52] U.S. Cl. ................................... 210/87; 73/19.12; 73/61.44; 73/155; 73/861.04; 73/863.03; 166/75.1; 210/96.1; 210/137; 210/170; 210/194
[58] Field of Search ............... 73/3, 61.41, 61.43, 73/61.44, 61.59, 19.04, 863.02, 863.03, 155, 861.04, 19, 12, 153; 166/75.1, 250, 264, 267; 210/96.1, 104, 170, 739, 741, 744, 137, 194, 805, 513, 800, 747, 87, 90

[56] References Cited

U.S. PATENT DOCUMENTS

| | | | |
|---|---|---|---|
| 3,528,282 | 9/1970 | Stotts et al. | 73/61.43 |
| 3,705,626 | 12/1972 | Glenn et al. | 166/267 |
| 4,210,015 | 7/1980 | Euzen et al. | 73/61.59 |
| 4,474,049 | 10/1984 | Hansen et al. | 73/3 |
| 4,596,136 | 6/1986 | Zacharias | 73/861.04 |
| 4,773,257 | 9/1988 | Aslesen et al. | 73/61.44 |
| 5,090,238 | 2/1992 | Jones | 73/61.44 |

OTHER PUBLICATIONS

Agar Corporation Drawing No. 4725, dated Mar. 29, 1989.

*Primary Examiner*—Joseph W. Drodge
*Attorney, Agent, or Firm*—Richard W. Collins

[57] ABSTRACT

A three-phase well test apparatus and method using a two-phase separator. A separator is used to separate well fluid into gas and liquid constituents. The gas constituent is measured by a gas flow meter, and a pressure control valve is used to prevent surging of the gas beyond the range of the meter A pump is used to pump liquid out of the separator through a liquid flow line. A recirculating line is provided, and a valve may be acutated between a flow position and a recirculating position in response to a liquid level in the separator. When liquid is not being flowed for measurement, it is recirculated to the separator and thereby continuously mixed to maintain the liquid in a homogeneous condition. Downstream from the valve is a liquid meter and a meter prover connection. The recirculation mixes the liquid A mixer may be positioned downstream from the pump to additionally mix the liquid flowing therethrough. A back pressure valve is positioned in the liquid flow line to keep an adequate back pressure on the meter.

3 Claims, 2 Drawing Sheets

THREE-PHASE WELL TEST APPARATUS USING PUMPED RECIRCULATION TO MAINTAIN HOMOGENOUS FLOW

BACKGROUND OF THE INVENTION

1. Field Of The Invention

This invention relates to well test apparatus and methods for testing fluids from oil and gas wells, and more particularly, to a three-phase well test apparatus and method utilizing a two-phase separator, pumping, mixing and back pressure control for increasing the accuracy of flow measurement of the liquid constituent and using flow rate control to improve the accuracy of measuring flow of the gas constituent.

2. Description Of The Prior Art

After an oil or gas well has been drilled, and throughout its production life, it is usually desirable to determine the quantities of the various constituents of the well fluid which are being produced by the well.

In some previous testing, the well fluid stream is flowed into a separator which separates the fluid into its gas, oil and water constituents. Such an operation is referred to as a "three-phase" well test. The separated constituents are flowed out of the separator in individual lines and the flow rate and volumes of each constituent is measured so that the operator knows the relative amounts of each. Other operations are carried out to insure proper calibration of the oil, gas and water meters. After testing, the fluid is typically recombined for transport to a processing facility or gathering system.

In a simpler test apparatus, the well fluid is only separated into gas and liquid components, and this is referred to as a "two-phase separator" well test. The oil and water form the liquid constituent or component, and the relative amounts of each may be measured by various methods, such as use of a water cut monitor and a liquids meter in conjunction with a net oil computer. The gas flow is measured the same way as in the three-phase test.

A problem with this prior "two-phase separator" well test apparatus is that liquid is flowed out the separator in a series of dump cycles. Between the dump cycles, the liquid may separate into oil and water constituents within the separator so that the liquid is mostly water when it is initially discharged during a dump cycle. This can result in inaccurate data. Further, when no liquid is flowing through the water cut monitor, the liquid can stagnate and cause problems with the sensor therein. The present invention solves these problems by providing pumped recirculation which results in the liquid being mixed and kept substantially homogeneous and also provides fluid flow through the water cut monitor at all times so that the liquid cannot stagnate therein.

Another problem with the prior "two-phase separator" well test is that a back pressure must be maintained in the gas section of the separator to move the liquid out of the separator. This results in an increase in the flowing well head pressure from the well which can cause problems. In the present invention, the liquid is pumped from the separator, and it is not necessary to increase the pressure in the separator to flow the liquid.

In either a two-phase separator or three-phase separator well test, a separation step is often supplemented with chemicals that are thoroughly mixed with the produced fluids upstream of the separator to enhance separation. Without such chemicals, the separation process is dependent upon the mechanical design of the separator vessel (retention time and fluid rate) and its internals (turbulence dampeners, coalescer elements, and fluid/interface level control devices). The measurement technique used in a properly designed well test system should dictate the flow control methods used and overall configuration of the well test equipment set up. For example, the measurement may be continuous or "on-line" with fluid discharged from the separator. This requires that fluid leave the separator at a rate and physical state/quality consistent with good measurement accuracy. The present invention provides such a system.

It is desirable to obtain well test accuracy which is both economical and which meets the needs of production engineers and operators. The present invention is designed to improve the accuracy of prior art two-phase separation tests without the necessity of total replacement of existing equipment.

SUMMARY OF THE INVENTION

The present invention includes a three-phase well test apparatus and method utilizing a two-phase separator. The method of well testing comprises the steps of using a separator for separating a well fluid stream into a gas component and a liquid component, measuring a volume or flow rate of the gas component, pumping the liquid component from the separator, and measuring the volume or flow rate of the liquid component discharged from the separator. Preferably, the liquid component is pumped from the separator through a mixer.

The method may further comprise the step of recirculating the liquid component back to the separator, and this recirculating step is preferably carried out in response to a liquid level in the separator. This step of the method may comprise actuating a snap-acting valve downstream of the mixer which closes off a main liquid flow line and directs the fluid through a recirculating line.

The method further comprises controlling the flow rate of the gas component within a predetermined metering range and may still further comprise the step of throttling peak flows without substantially changing a flowing well head pressure from the well.

The apparatus for testing well fluid constituents of the present invention comprises a separator connectable to the well so that the fluid constituents from the well will flow into the separator, a gas outlet line in communication with a gas section of the separator, a liquid outlet line in communication with a liquid section of the separator, a pump in the liquid line and adapted for pumping liquid from the separator, and liquid flow measuring means downstream of the pump for measuring a liquid flow rate or volume over a period of time therethrough. The apparatus may further comprise gas flow measuring means in the gas outlet line for measuring a flow rate or volume over a period of time of the gas through the gas outlet line and a flow limiting or control valve in the gas outlet line downstream of the gas flow measuring means which is adapted for limiting the flow rate of gas to the gas flow measuring means. The flow limiting valve is preferably controlled in response to a back pressure across the gas flow measuring means.

The apparatus also comprises a recirculating line in communication with a separator and recirculating means in communication with the liquid line and the recirculating line for allowing fluid flow from the pump to the liquid flow measuring means when in a flow position and for recirculating and mixing of the liquid from the pump to the separator through the recirculating line when in a recirculating position. A liquid level control means on the separator is preferably used for actuating the recirculating means between flow and recirculating positions thereof.

The apparatus further comprises pressure control means downstream of the pump for maintaining a predetermined liquid stream (back) pressure above the liquid flash point. The pressure control means may comprise a control valve in the liquid outlet line.

Mixing means may be used downstream of the pump and upstream of the flow measuring means for additional mixing of liquid flowing therethrough Numerous objects and advantages of the invention will become apparent as the following detailed description of the preferred embodiment is read in conjunction with the drawings which illustrate such embodiment.

DESCRIPTION OF THE PREFERRED EMBODIMENT

Figure 1:
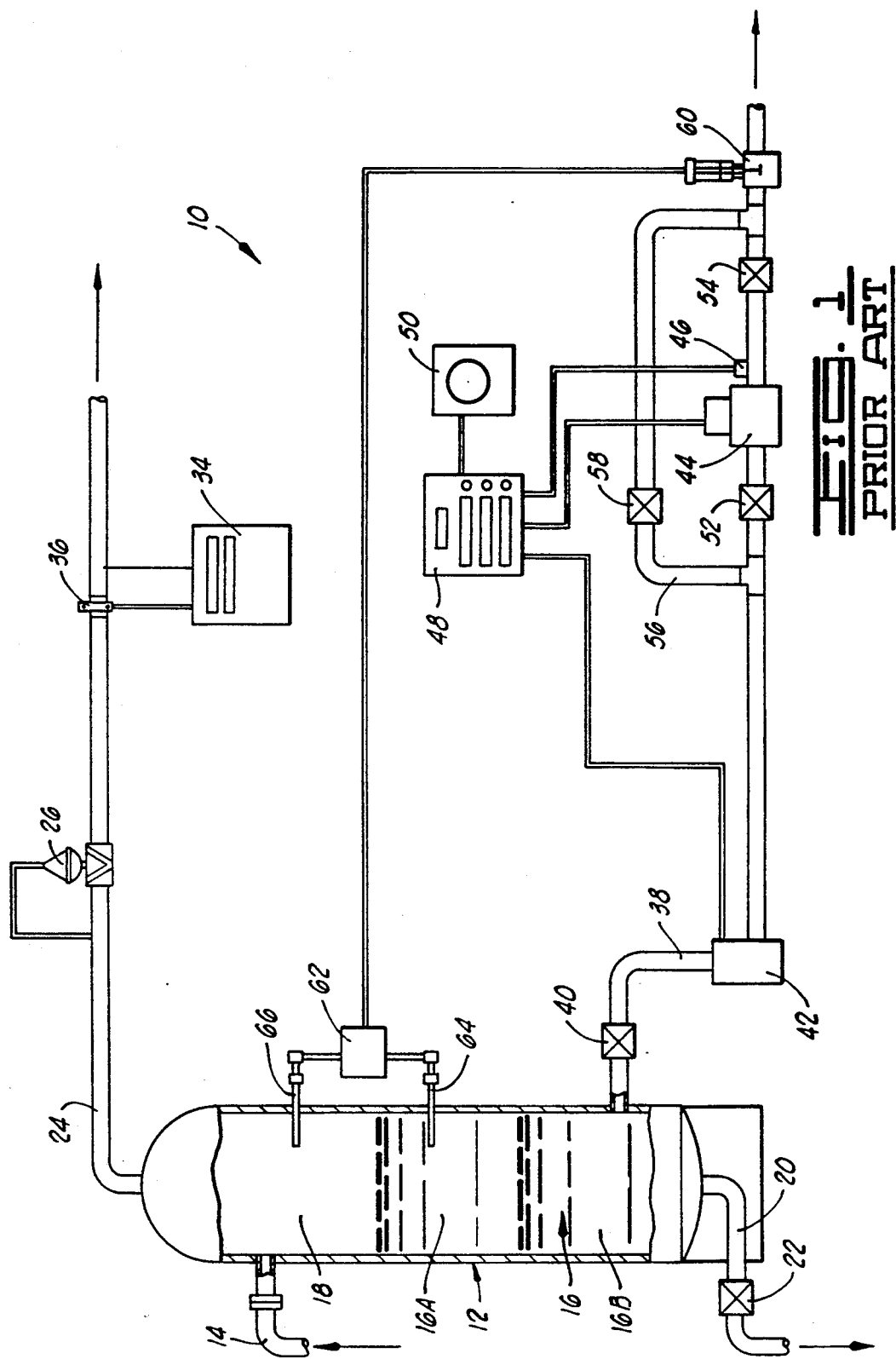
FIG. 1 presents a schematic of a prior art well test apparatus.

Referring now to the drawings, a prior art three-phase well test apparatus using a two-phase separator and the well test apparatus of the present invention will be discussed.

PRIOR ART WELL TEST APPARATUS

Referring to FIG. 1, a prior art well test apparatus is shown and generally designated by the numeral 10. Apparatus 10 is connected to a well head, and the fluid flowing through test apparatus 10 is generally recombined for transport to a processing facility or gathering system. Such well heads and associated piping and valves are known to those skilled in the art of well fluid testing and therefore are not shown herein.

Prior art well test apparatus 10 includes a separator 12 with an inlet line 14 in communication therewith. Inlet line 14 is connected to the well head. The fluid in separator 12 forms a liquid section 16 and a gas section 18. Liquid section 16 will tend to separate over time into an oil section 16A and a water section 16B. A drain or desanding line 20 is connected to the bottom of separator 12 and has a valve 22 therein.

A gas outlet line 24 is connected to gas section 18 of separator 12. Disposed in gas outlet line 24 is a back pressure valve or regulator 26.

A gas meter 34 determines the gas flow rate or volume over a period of time through gas outlet line 24 by a signal received from sensor 36.

A liquid outlet line 38 with a valve 40 therein is connected to liquid section 16 of separator 12 and thereby provides an outlet for the liquids after separation of the gas therefrom.

Also disposed in liquid outlet line 38 are a water cut monitor 42 and a liquid flow meter 44. Flow meter 44 may be of any kind generally known in the art, such as a positive displacement volumetric meter. Also disposed in liquid outlet line 38 is a temperature and pressure sensing means 46. Water cut monitor 42, flow meter 44 and temperature and pressure sensing means 46 are connected to a net oil computing means 48, such as a net oil computer 48. One such device, manufactured by Agar Corporation, indicates the percent of water, the total amount of water, the total amount of oil, and the total liquid flow rate, but the invention is not intended to be so limited. Net oil computer 48 may be a separate component as illustrated or can be part of another computer system. A recorder 50 may be attached to net oil computer 48 for keeping track of this information over time.

A valve 52 is disposed in liquid outlet line 38 upstream from meter 44, and a similar valve 54 is disposed downstream from the meter. An auxiliary liquid line 56 is connected to liquid outlet line 38 upstream from valve 52 and downstream from valve 54. Another valve 58 is disposed in auxiliary liquid line 56. Normally, valve 58 is closed, and valves 52 and 54 are open. By closing valves 52 and 54 and opening valve 58, it will be seen that meter 44 may be removed for repair or calibration while still allowing liquid flow through the system via auxiliary liquid line 56.

Downstream from auxiliary liquid line 56 a snap acting valve 60 is positioned in liquid outlet line 38. Snap acting valve 60 is connected to a liquid level controller 62. Liquid level controller 62 has a low liquid level sensor 64 and a high liquid level sensor 66 connected thereto. Liquid level controller 62 is adapted for closing snap acting valve 60 when the liquid level in liquid section 16 of separator 12 drops to the level of low liquid level sensor 64. Liquid level controller 62 opens snap acting valve 60 when the liquid level in liquid section 16 reaches the level of high liquid level sensor 66. Thus, liquid is discharged from separator 12 by the gas pressure into liquid outlet line 38 only after high liquid level sensor 66 has been activated, and the liquid flow out of separator 12 is shut off after low liquid level sensor 64 has been activated. In other words, liquid testing is conducted on liquids discharged through a series of dump cycles from separator 12 As previously indicated, the liquid in separator 12 may further separate into an oil constituent 16A and a water constituent 16B after a period of time. This can occur between dump cycles such that the initial liquid flowing from separator 12 may be substantially all water. If this occurs, this high percentage of water may be outside the range of water cut monitor 42 and net oil computer 48, which can result in inaccurate or invalid data. As will be further described herein, the present invention avoids this problem.

It will be seen that by using gas meter 34 and net oil computer 48, the flow rates or volumes over time of the gas, oil and water through separator 12, and thus flowing out the well head, may be determined

THE PRESENT INVENTION

Figure 2:
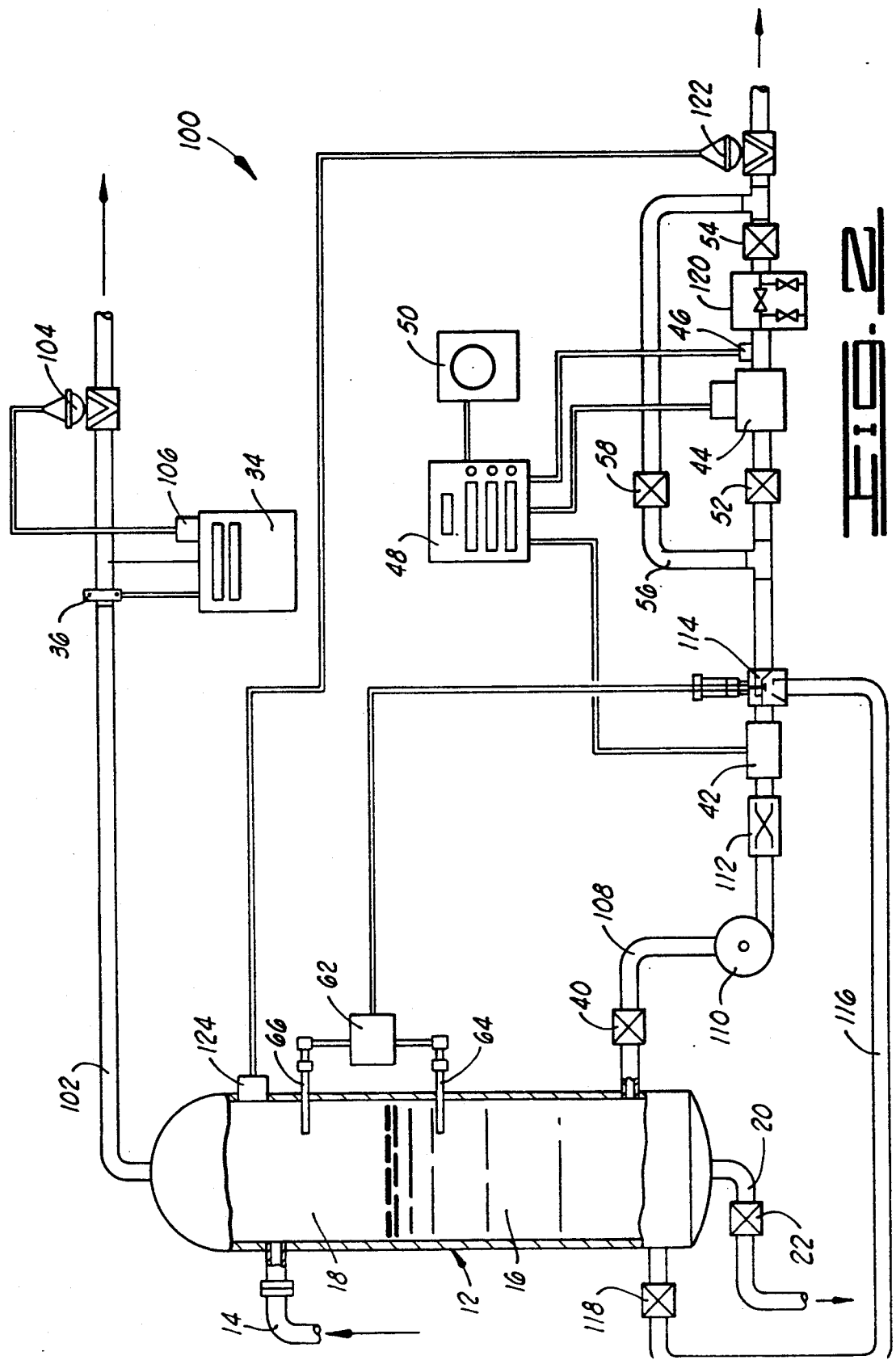
FIG. 2 presents a schematic of the well test apparatus of the present invention.

Referring now to FIG. 2, the well test apparatus of the present invention is shown and generally designated by the numeral 100. A comparison of FIGS. 1 and 2 will show that new well test apparatus 100 is an improvement of prior well test apparatus 10. In the following description, the same reference numerals are used for components in well test apparatus 100 as were used in prior art apparatus 10.

Well test apparatus 100 includes the same separator 12 with inlet line 14 connected thereto. Separator 12 again has a liquid section 16 and a gas section 18. As will be further seen herein, liquid is recirculated in the present invention so that the liquid in liquid section 16 does not separate into oil and water constituents.

A desanding or drain line 20 is connected to the bottom of separator 12, and this line has valve 22 therein.

A gas outlet line 102 is connected to gas section 18 of separator 12. Disposed in gas outlet line 102 is a flow control or limiter valve 104 which is used to control the gas flow rate through gas outlet line 102. Ordinarily, control valve 104 does not cause any gas pressure increase upstream thereof sufficient to substantially change the pressure in separator 12. However, control valve 104 may be used as a backup when necessary to cause an increase in pressure in separator 12 for forcing liquid from the separator.

A gas flow measuring or metering means, such as gas meter 34, is used to measure the flow rate or volume over a period of time through gas outlet line 102 in response to a signal from sensor 36. Meter 34 through a transducer 106 sends a signal to control valve 104 and thus controls valve 104 so that the gas flow through sensor 36 does not surge and therefore does not overrange gas meter 34.

A liquid outlet line 108 is connected to liquid section 16 of separator 12, and the liquid outlet line has valve 40 therein Also disposed in liquid outlet 108 is a substantially constant volume or rate pumping means, such as a pump 110. For example, a rotary, positive displacement pump is not affected as much by pressure fluctuations and viscosity changes as are centrifugal-type pumps. A rotary or gear pump is preferred because reciprocating positive displacement pumps produce pulsating flow and are therefore not recommended for flow metering applications.

In one embodiment, downstream from pump 110 is a mixing means for substantially thoroughly mixing the liquid flowing through liquid outlet line 108. In the illustrated embodiment, the mixing means is characterized by an in-line mixer 112, such as a static mixer.

Downstream from mixer 112, water cut monitor 42 is disposed in liquid outlet line 108.

Downstream from water cut monitor 42 in liquid outlet line 108 is a recirculating means, such as a snap-acting valve 114. Snap-acting valve 114 is the same as, or similar to, snap-acting valve 60 in prior art well test apparatus 10.

A liquid recirculating line 116 interconnects snap-acting valve 114 and liquid section 16 of separator 12. A valve 118 is disposed in liquid recirculating line 116 to open or close the recirculating line.

Snap-acting valve 114 has a flow position wherein liquid flows substantially straight through liquid outlet line 108. Snap-acting valve 114 also has a recirculating position in which liquid outlet line 108 is diverted and the liquid pumped from pump 110 is recirculated through liquid recirculation line 116 back to liquid section 16 of separator 12.

Snap-acting valve 114 is connected to a liquid level control means, such as liquid level controller 62, which in turn is connected to low liquid level sensor 64 and high liquid level sensor 66 When a low liquid level is sensed by low liquid level sensor 64, liquid level controller actuates snap-acting valve 114 to its recirculating position. When the liquid level in liquid section 16 reaches the level of high liquid level sensor 66, liquid level controller 62 actuates snap-acting valve 114 to its flow position so that measurement of the liquid may be carried out. Thus, it will be seen that the liquid is continually recirculated through liquid recirculation line 116 when the liquid level drops to low liquid level sensor 64, and the liquid passes on through liquid outlet line 108 for testing after the liquid level reaches high liquid level sensor 66.

Thus, when liquid is not being flowed for measurement, it is recirculated to separator 12. This recirculation continuously mixes the liquid so that it does not have a chance to separate into oil and liquid constituents in the separator. The mixing means, such as mixer 112, provides additional mixing when necessary to insure that the liquid is substantially homogeneous Downstream from snap-acting valve 114 is a liquid flow measuring or metering means, such as volumetric meter 44, and temperature and pressure sensing means 46. Downstream from meter 44 is a meter proving means such as meter prover connection 120, which allows meter 44 to be calibrated without being removed from liquid outlet line 108.

Valve 52 is disposed upstream from meter 44, and valve 54 is disposed downstream from meter prover connection 120. Auxiliary liquid line 56 with valve 58 therein may be connected to liquid outlet line 108 upstream from valve 52 and downstream from valve 54 so that meter 44 or prover connection 120 may be removed from the system while still allowing liquid flow therethrough.

Water cut monitor 42, meter 44 and temperature and pressure sensing means 46 are connected to net oil computer 48 in substantially the same manner as in prior art apparatus 10. Recorder 50 may be connected to net oil computer 48 for recording the data therefrom.

Downstream from auxiliary liquid line 56 is a back pressure valve 122 which is connected to a pressure control 124 in communication with gas section 18 of separator 12. Pressure sensor control 124 and back pressure valve 122 provide a back pressure control means to insure that an adequate back pressure is supplied on liquid outlet line 108 to maintain sufficient pressure for accurate metering Inaccuracies of measured volumes on conventional well test apparatus, such as that shown in FIG. 1, and on other typical prior art three-phase well test apparatus result from changes in well back pressure during the test from separation of the liquids within liquid section 16 of separator 12 and from gas breakout in the liquid discharge. By using a system such as that shown in FIG. 2, back pressure valve 122 and pump 110 allow the conducting of a well test without increasing the flowing well head pressure. This not only provides tests which are more representative of normal well productivity, but also results in a reduction in the time required to test the well since stabilizing production at higher well head pressures is no longer a factor with which the well operator must contend. Also, the thorough mixing of the liquid resulting from its being recirculated by pump 110 and flowing through mixer 112, insures that a more homogeneous liquid is flowed through the apparatus.

It will be seen that apparatus 100 and its method of use provide several improvements over prior art apparatus 10 shown in FIG. 1. In apparatus 100, there is substantially continual mixing of the liquid as a result of the pumped recirculation which prevents the liquid from separating into oil and water constituents in separator 12. Also, since the liquid is pumped from separator 12, it is not necessary to maintain a back pressure therein, and therefore the flowing well head pressure is not increased. Further, back pressure valve 122 maintains a continual positive pressure through meter 44 for maximum accuracy.

This improved liquid testing portion of the system, when combined with the more accurate gas measuring system utilizing flow control valve 104, insures a high accuracy in measuring the flow rates of the well fluid constituents Obviously, with this more accurate data, the operator has much better information about the production of the well.

It will be seen, therefore, that the three-phase well test apparatus and method using a two-phase separator of the present invention is well adapted to carry out the ends and advantages mentioned as well as those inherent therein. While a presently preferred embodiment has been shown for the purposes of this disclosure, numerous changes in the arrangement and construction of parts may be made by those skilled in the art. All such changes are encompassed within the scope and spirit of the appended claims.

What is claimed is:

1. An apparatus adapted for testing well fluid constituents from a well, said apparatus comprising:

a separator connectable to a flowline from said well so that the fluid constituents from said well will flow directly into said separator;

a gas outlet line in communication with a gas containing section of said separator;

gas flow measuring means in said gas outlet line for measuring a flow rate of said gas through said gas outlet line;

a flow limiting valve in said gas outlet line downstream of said gas flow measuring means which is adapted for limiting the flow rate of gas to said gas flow measuring means;

a liquid outlet line in communication with a liquid containing section of said separator;

a constant rate pump in said liquid line adapted for pumping liquid from said separator;

liquid flow measuring means downstream of said pump for measuring a volume of liquid flowing therethrough over a period of time;

a liquid recirculating line in communication with said separator;

recirculating means in communication with said liquid outlet line and said recirculating line for allowing liquid flow from said pump to said liquid flow measuring means but not through said recirculating line when in a flow position and for recirculating liquid from said pump to said separator through said recirculating line when in a recirculating position;

liquid level control means on said separator for shifting said recirculating means between said flow and recirculating positions;

mixing means in said liquid outlet line downstream from said pump for mixing fluid flowing therethrough; and pressure control means downstream of said liquid flow measuring means for maintaining a predetermined back pressure across said liquid flow measuring means.

2. The apparatus of claim 1 wherein said liquid flow measuring means comprises a volumetric meter and a water cut monitor in said liquid outlet line, and a net oil computer connected to said volumetric meter and said water cut monitor.

3. The apparatus of claim 1 wherein said pressure control means includes a back pressure valve in said liquid outlet line, and said back pressure valve is responsive to a pressure sensor connected to the gas section of said separator.

* * * * *